(12) United States Patent
Rajappa et al.

(10) Patent No.: US 6,378,082 B1
(45) Date of Patent: Apr. 23, 2002

(54) GENERATING STROBE SIGNALS AT DIFFERENT VOLTAGE LEVEL MODES FOR RECEIVING DATA AT GRAPHICS INTERFACE PORT

(75) Inventors: Srinivasan T. Rajappa, Folsom; Robert J. Johnston, Fair Oaks, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/345,711

(22) Filed: Jun. 30, 1999

(51) Int. Cl.[7] ................................................. G06F 1/06
(52) U.S. Cl. ........................ 713/501; 713/400; 713/600
(58) Field of Search ................................. 713/322, 501, 713/600, 400

(56) References Cited

U.S. PATENT DOCUMENTS 5,951,688 A * 9/1999 Moyer et al. ............... 713/320
6,092,212 A * 7/2000 Muljono et al. ............. 713/600

* cited by examiner

Primary Examiner—Kenneth S. Kim
(74) Attorney, Agent, or Firm—Blakely, Sokoloff, Taylor & Zafman LLP

(57) ABSTRACT

The present invention is a method and apparatus to generate first and second strobe signals to receive data on an interface port of a processor operating in first and second modes at first and second voltage levels, respectively. The second voltage level is higher than the first voltage level. A selector provides first and second selected signals from a plurality of signals which corresponds to the first and second modes. The selector operates at the second voltage level. A signal generator is coupled to the selector to generate the first and second strobe signals from the first and second selected signals.

30 Claims, 4 Drawing Sheets

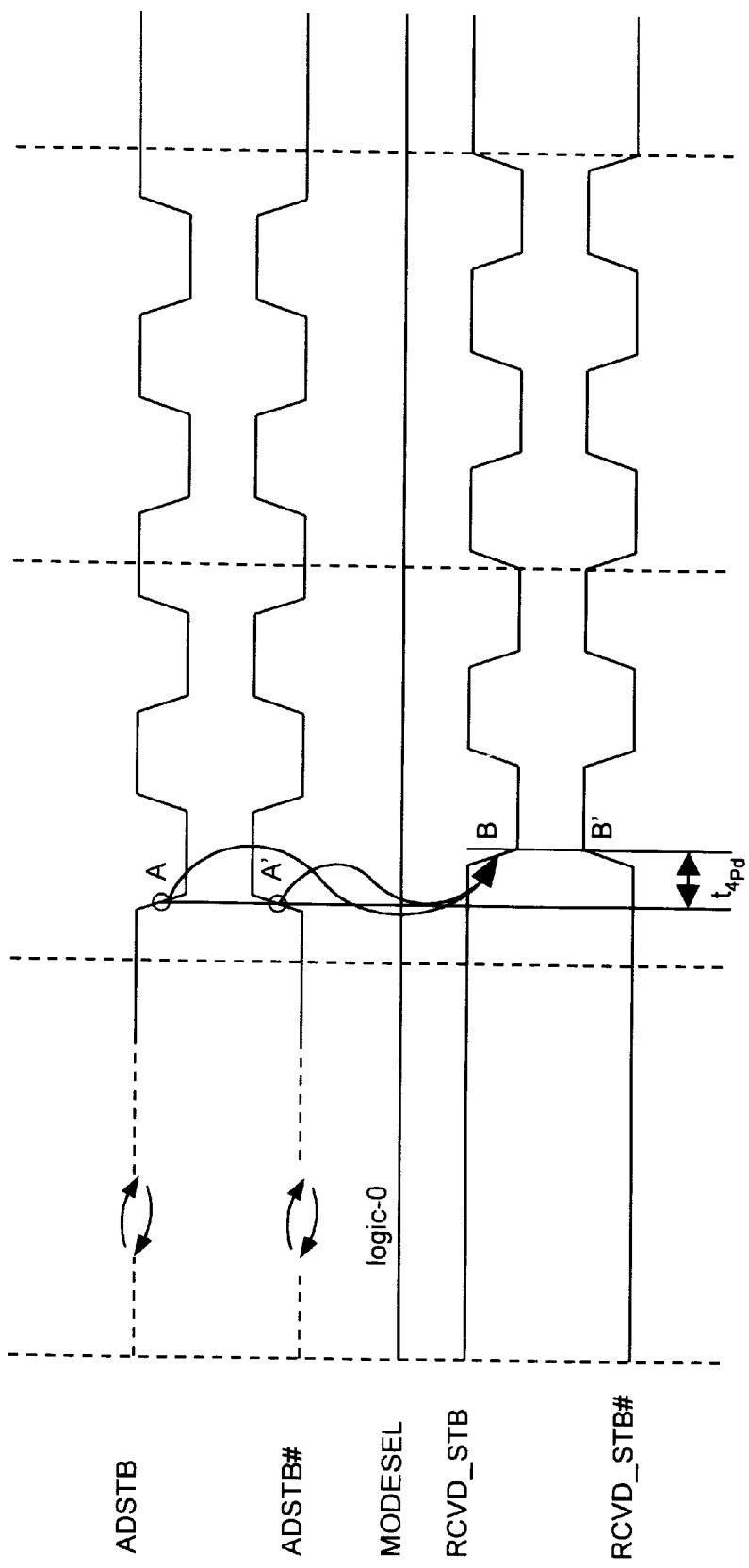

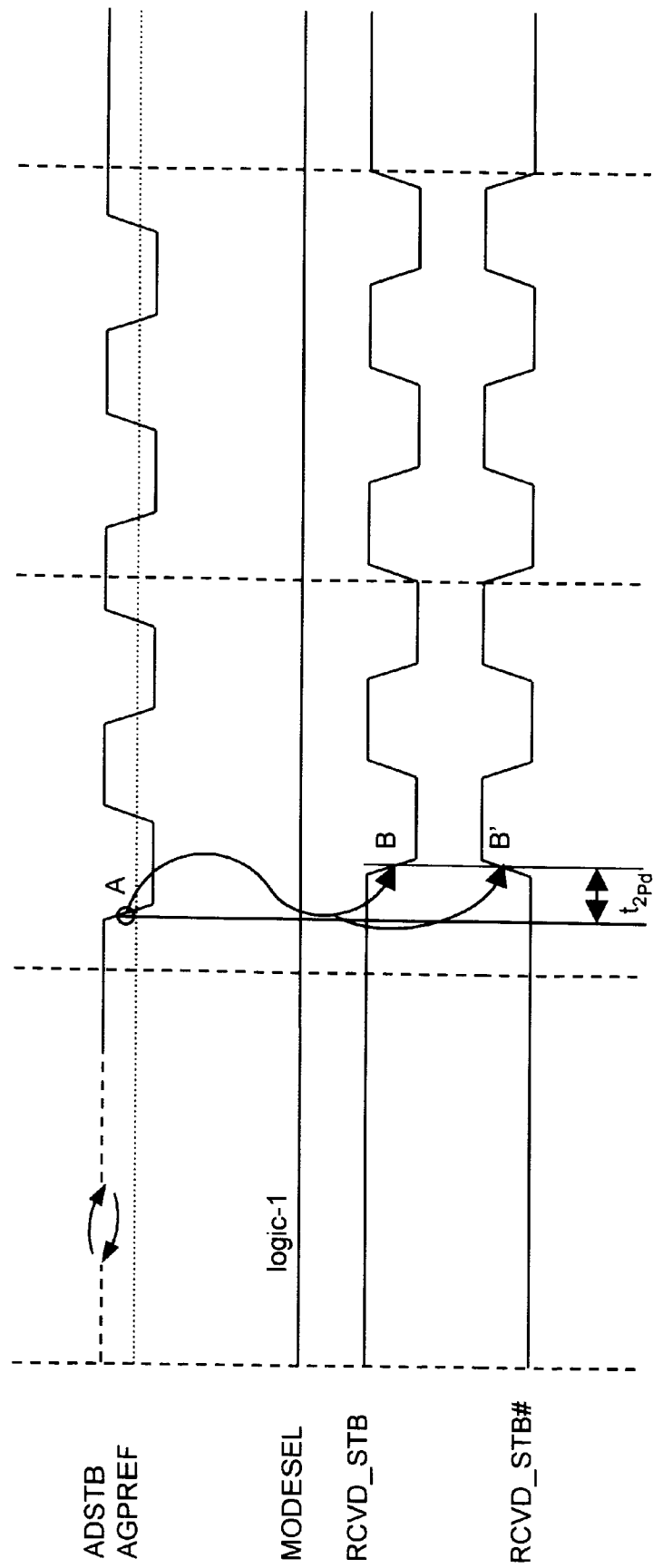
FIG. 3B  AGP-2X MODE

GENERATING STROBE SIGNALS AT DIFFERENT VOLTAGE LEVEL MODES FOR RECEIVING DATA AT GRAPHICS INTERFACE PORT

BACKGROUND

1. Field of the Invention

This invention relates to signaling. In particular, the invention relates to strobe signaling.

2. Description of Related Art

Advanced processors usually are developed as an improvement from previous generations. To maintain downward compatibility, newer processors tend to maintain the same features in the older models while incorporating additional features. However, when there is a significant upgrade, maintaining compatibility with existing supporting circuits and/or specifications is a difficult task.

For example, the Accelerated Graphics Port (AGP) is an advanced graphics interface that allows high performance graphics to be generated in a personal computer (PC) platform. The AGP physical interface is optimized for a point to point topology using either 1.5 volt or 3.3 volt signaling. The baseline performance level utilizes a 66 MHz clock to provide a peak bandwidth of 266 megabytes per second (MB/s). The AGP includes two options for higher performance levels.

The first option provides a peak bandwidth of 533 MB/s. This mode uses a double-clocked data technique to transfer twice the data per each AGP clock. This AGP mode, referred to as the 2X transfer mode, or 2X mode, requires additional interface timing strobes and different signal timings from the baseline 1X mode.

The second option provides a peak bandwidth of up to 1066 MB/s. This mode uses a quad-clocked data transfer technique to transfer four times the data per each 66 MHz clock. This mode, referred to as 4X transfer mode, requires differential interface timing strobes and different signal timings from the 66 MHz baseline and the 2X mode AGP requirements.

The 1X and 2X modes can operate at both the 1.5 V and 3.3 V signaling level following the AGP 1.0 specifications. The 4X mode, however, is restricted to the 1.5 V signaling level, following the Accelerated Graphics Port Interface Specification Revision 2.0 published by Intel Corporation dated May 4, 1998 ("AGP 2.0 Specification") because of signal integrity limitations. Accelerated Graphics Port Interface Specification Revision 1.0 published by Intel Corporation dated Jul. 31, 1996 ("AGP 1.0 Specification") the strobe input stage is sensed differentially with respect to the analog input reference bias which is nominally set at 0.4. Vddq for a 3.3 V AGP environment. The AGP 2.0 specification introduces the strobe complement signal and hence requires the strobe input stage to be fully differential sensing as opposed to with respect to a reference.

It is desirable to have a physical interface that can accommodate both the 2X and 4X transfer modes. Traditional methods use multiple differential amplifiers with all possible input combinations followed by tristable output stages. This approach is costly from a design perspective because it uses expensive die real estate.

Therefore there is a need in the technology to provide a simple and efficient method to implement a multi-mode strobe signaling to accommodate multiple operational modes of advanced processors.

SUMMARY

The present invention relates to a method and apparatus to generate first and second strobe signals to receive data on an interface port of a processor operating in first and second modes at first and second voltage levels, respectively. The second voltage level is higher than the first voltage level. Briefly, the apparatus comprises a selector provides first and second selected signals from a plurality of signals which corresponds to the first and second modes. The selector operates at the second voltage level. The apparatus further comprises a signal generator that is coupled to the selector to generate the first and second strobe signals from the first and second selected signals.

BRIEF DESCRIPTION OF THE DRAWINGS

The features and advantages of the present invention will become apparent from the following detailed description of the present invention in which:

FIG. 3A is a timing diagram illustrating a 4X transfer mode signaling according to one embodiment of the invention.

FIG. 3B is a timing diagram illustrating a 2X transfer mode signaling according to one embodiment of the invention.

DESCRIPTION

The present invention is a method and apparatus for generating multi-mode strobe signals in a processor. The input signals operate in two modes having two different voltage requirements. The technique uses select elements that can sustain both voltage requirements. Differential amplifiers are used to generate differential receiver strobe signals to comply with the processor specifications.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
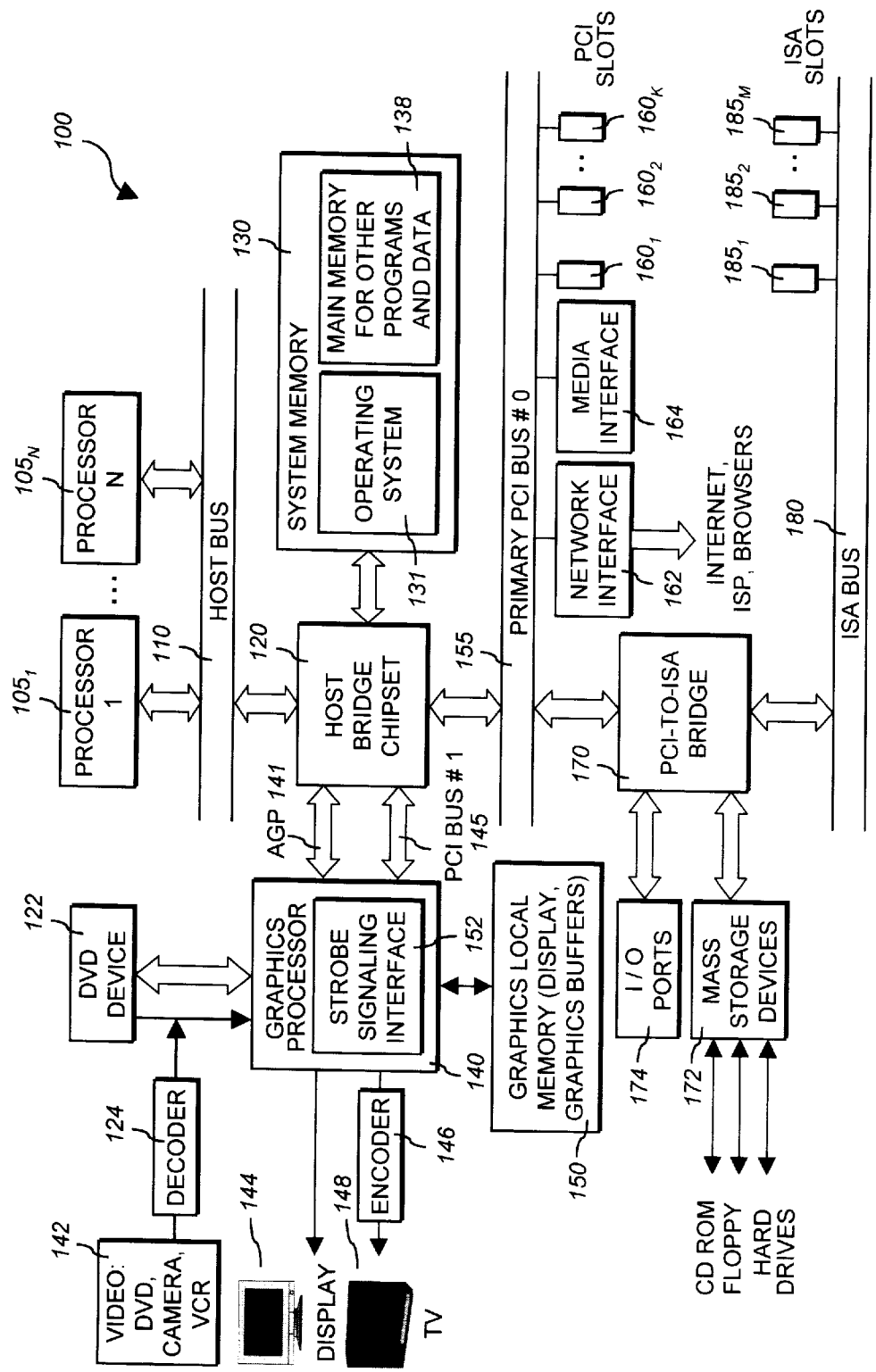
FIG. 1 is a diagram illustrating a system in which one embodiment of the invention can be practiced.

FIG. 1 is a diagram illustrating a computer system 100 in which one embodiment of the invention can be practiced. The computer system 100 includes N processors $105_1$ through $105_N$, a host bus 110, a host bridge chipset 120, a system memory 130, a graphics processor 140, a digital video disk (DVD) device 122, a video device 142, a decoder 124, a display monitor 144, a television (TV) 148, an encoder 146, a graphics local memory 150, a primary PCI bus #0 155, a PCI bus #1 145, an accelerated graphics port (AGP) 141, K PCI slots $160_1$ to $160_K$, a network interface 162, a media interface 164, a PCI-to-ISA bridge 170, mass storage devices 172, Input/Output (I/O) ports 174, an ISA bus 180, and ISA slots $185_1$ to $185_M$.

Each of the processors $105_1$ to $105_N$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 120 includes a number of interface circuits to allow the host processors $105_1$ to $105_N$ access to the system memory 130, the graphics processor 140, and the primary PCI bus #0 155. The system memory 130 represents one or more mechanisms for storing information. For example, the system memory 130 may include non-volatile or volatile memories. Examples of these memories include flash memory, read only memory (ROM), or random access memory (RAM). The system memory 130 is loaded with an operating system (OS) 131, and other programs and data 138. Of course, the system memory 130 preferably contains additional software (not shown), which is not necessary to understanding the invention.

The PCI slots $160_1$ to $160_K$ provide interfaces to PCI devices. Examples of PCI devices include the network interface 162 and the media interface 164. The network interface 162 connects to communication channel such as the Internet. The Internet provides access to on-line service providers, Web browsers, and other network channels. The media interface 164 provides access to audio and video devices.

The graphics processor 140 is a high performance graphics controller that perform graphics functions such as 3-D rendering operations, progressive meshes, painting, drawing, etc. The graphics processor 140 is coupled to the host bridge 120 via the AGP 141 and the PCI bus #1 145. In one embodiment, the AGP 141 is developed by Intel Corporation of Santa Clara, Calif. The graphics processor includes a strobe signaling interface 152 that generate the strobe signals to capture data on the AGP 141. The graphics processor 140 has access to its own graphics local memory 150. The graphic local memory 150 may contain graphics programs and data for displaying. The DVD device 122 represents any digital video device or instrument. The video device 142 provides video input such as DVD, camera, or video cassette recorder (VCR) to the graphics processor 140. The decoder 124 decodes the video signals from the video device 142 to the graphics processor 140. The display monitor 144 displays the graphics as generated by the graphics processor 140. The encoder 146 receives the graphics data from the graphics controller 140 and encodes into an analog signal to be compatible for TV display on the TV set 148.

The PCI-to-ISA bridge 170 provides access to the ISA bus 180, mass storage devices 172, and I/O ports 174. The mass storage devices 172 include CD ROM, floppy diskettes, and hard drives. The ISA bus 180 has a number of ISA slots $185_1$ to 185M to interface to ISA devices. Examples of ISA devices include data entry devices (e.g., keyboard, mouse), printers, etc.

The AGP 141 is a physical interface port between the host bridge chipset 120 and the graphics processor 140. Address and data information is transferred over the AGP 141 synchronized by clock and strobe signals. Supporting devices such as buffers, drivers, clock circuits, and strobe logic circuitsw are designed to accommodate the two operating modes on the AGP 141, namely, the 4X and 2X transfer modes. The strobe signaling interface 152 provides an interface to accommodate both of these transfer modes.

Figure 2:
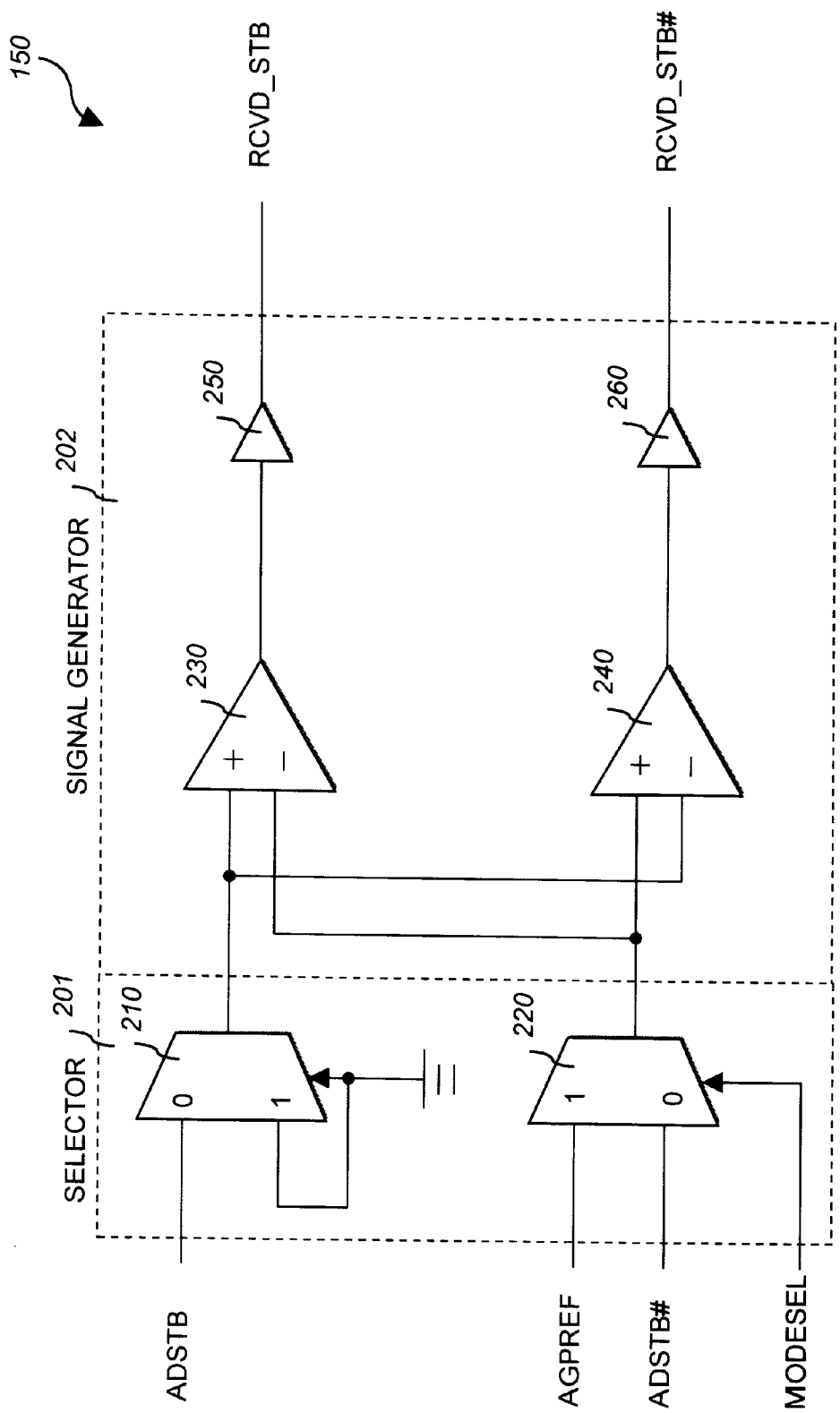
FIG. 2 is a diagram illustrating a strobe signaling interface according to one embodiment of the invention.

FIG. 2 is a diagram illustrating a strobe signaling interface 152 according to one embodiment of the invention. The strobe signaling interface 152 includes a selector 201 and a signal generator 202.

The selector 201 receives the address strobe high and low (ADSTB and ADSTB#) signals, an AGP reference (AGPREF) signal, and a mode select (MODESEL) signal. The selector 201 generates selected signals to the signal generator 202. The signal generator 202 generates the strobe signals to receive the data on the physical interface port AGP of the graphics processor. The strobe signals include a complementary receiver strobe high (RCVD_STB) signal and a receiver strobe low (RCVD_STB#) signal. The RCVD_STB and RCVD_STB# signals are used to latch or trigger the latching of data transferred on the AGP 141 in FIG. 1.

The selector 201 includes multiplexers 210 and 220. The multiplexers 210 and 220 have similar tolerant characteristics and propagation delays. The tolerant characteristics include the ability to provide an output swing of either between 0 to 3.3 V or 0 to 1.5 V to comply with the AGP 1.0 and 2.0 specifications, respectively. The multiplexers 210 and 220 operate at the higher voltage level, namely, the 0 to 3.3 V. Since they operate at the higher voltage level, they can provide signaling for both the low and high voltage levels of 1.5 V and 3.3 V, respectively. The multiplexers 210 and 220 may be implemented using native devices if the process does support the 3.3 V requirement. If the process does not support the 3.3 V, the multiplexers 210 and 220 can be implemented in two ways. In the first method, the external voltage swing is conditioned to a voltage that is more tolerable (e.g., 3.3 V) using an input conditioner with clamp and then multiplexing the proper reference voltage AGPREF. In the second method, select elements are implemented using multiplexing transistors with thicker gate-oxide thickness that could sustain the gate-oxide stress caused by the high voltage. The second method is simple and straightforward but it may require a change in the fabrication process.

The multiplexer 210 receives the address strobe high (ADSTB) signal and generates the first selected signal to the differential amplifiers 230 and 240. The multiplexer 210 can be configured so that the ADSTB signal is always selected, in which case the multiplexer 210 acts like a delay element to provide a propagation delay comparable with that of the multiplexer 220. In one embodiment, the multiplexer 210 is replaced by a buffer having the same tolerant characteristics and propagation delay as the multiplexer 220. The ADSTB signal is common to both of the two operating modes.

The multiplexer 220 receives the first and second mode signals: the AGP reference (AGPREF) signal and the address strobe low (ADSTB#) signal. The AGPREF signal represents a constant reference voltage which is set approximately to 0.4 Vddg (for 2X transfer mode) or 0.5 Vddg (for 4X transfer mode). The ADSTB and the ADSTB# are complementary signals. The multiplexer 220 receives the mode select (MODESEL) signal as its select signal and generates a second selected signal to the signal generator 202. The MODESEL signal is used to select between the 2X mode and the 4X mode. When MODESEL is low, the 4X mode is selected and the AGPREF signal is generated at the output of the multiplexer 220. When MODESEL is high, the 2X mode is selected and the ADSTB# signal is generated at the output of the multiplexer 220. The second selected signal is either the AGPREF or the ADSTB# signals depending on the MODESEL signal.

The signal generator 202 includes differential amplifiers 230 and 240, and buffers 250 and 260. The first differential amplifier 230 provides a first differential signal corresponding to the receiver strobe signal high (RCVD_STB). The positive and negative inputs of the differential amplifier 230 are connected to the first and second selected signals from the multiplexers 210 and 220, respectively. When the 4X mode is selected, the first differential amplifier 230 generates the first differential signal which is the difference between the ADSTB and the ADSTB# signals according to the AGP 2.0 specification. When the 2X mode is selected, the first differential amplifier 230 generates the first differential signal which is the difference between the ADSTB and the AGPREF according to the AGP 1.0 specification.

The second differential amplifier 240 provides the second differential signal corresponding to the receiver strobe signal low (RCVD_STB#). The positive and negative inputs of the second differential amplifier 240 are connected to the second and first selected signals from the multiplexers 220 and 210, respectively. When the 4X mode is selected, the second differential amplifier 240 generates the second differential signal which is the difference between the ADSTB# and the ADSTB signals according to the AGP 2.0 specification. When the 2X mode is selected, the second differential amplifier 240 generates the second differential signal which is the difference between the AGPREF and the ADSTB according to the AGP 1.0 specification.

The first and second buffers 250 and 260 are used to buffer the outputs of the differential amplifiers 230 and 240 to generate the receiver strobe RCVD_STB and RCVD_STB# signals, respectively.

FIG. 3A is a timing diagram illustrating a 4X transfer mode signaling according to one embodiment of the invention.

The MODESEL signal is low to select the 4X transfer mode. The ADSTB and ADSTB# signals are complementary. The delay paths from the ADSTB and ADSTB# to the RCVD_STB and RCVD_STB# signals are approximately equal because the paths go through devices with similar process and construction, e.g., the multiplexers 210 and 220, the differential amplifiers 230 and 240, and the buffers 250 and 260. Therefore, both the RCVD_STB and RCVD_STB# signals are subject the same propagation delay, shown as t4pd in the timing diagram. The complementary transitions of the waveforms RCVD_STB and RCVD_STB# are synchronized due to the complementary transitions of the ADSTB and ADSTB# signals. As an example, the sample points A and A' on the ADSTB and ADSTB# signals, respectively, correspond to the sample points B and B' on the RCVD_STB and RCVD_STB# signals, respectively.

FIG. 3B is a timing diagram illustrating a 2X transfer mode signaling according to one embodiment of the invention.

The MODESEL signal is high to select the 2X transfer mode. In this mode, the RCVD_STB and RCVD_STB# signals are generated as the differential outputs between the ADSTB signal and the AGPREF signal. Again the delay paths from the ADSTB and the AGPREF to the RCVD_STB and RCVD_STB# signals are approximately equal because the paths go through devices with similar process and construction, e.g., the multiplexers 210 and 220, the differential amplifiers 230 and 240, and the buffers 250 and 260. Therefore, the resulting RCVD_STB and RCVD_STB# signals are complementary where the complementary transitions are synchronized. In addition, since the reference AGPREF signal is at constant level, the switching waveforms are due mainly to the switching waveform of the ADSTB signal. As an example, the sample point A on the ADTSB signal corresponds to the sample points B and B' on the RCVD_STB and RCVD_STB# signals after a propagation delay of t2pd.

Thus, the present invention is a technique to generate complementary receiver strobe signals for both the 4X and 2X transfer modes of the AGP physical interface. The technique uses a high-voltage tolerant multiplexer to handle an output swing of either between 0 to 3.3V or 0 to 1.5V that are compliant to the 2X or 4X transfer modes.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

selecting first and second selected signals from a plurality of signals by a selector, the plurality of signals being provided by a processor operating in first and second modes at first and second voltage levels, respectively, the second voltage level being higher than the first voltage level, the selector operating at the second voltage level; and generating first and second strobe signals from the first and second selected signals by a signal generator the first and second strobe signals being complementary to receive data on an interface port of the processor.

2. The method of claim 1 wherein selecting comprises:

receiving a common signal from the plurality of signals to provide the first selected signal by a first selecting element in the selector; and receiving first and second mode signals from the plurality of signals to provide the second selected signal in response to a mode select signal by a second selecting element in the selector.

3. The method of claim 2 wherein receiving the common signal comprises receiving the common signal complementary to the second mode signal.

4. The method of claim 3 wherein receiving the first and second mode signals comprise receiving the first mode signal, the first mode signal being a reference signal having a voltage level proportional to one of the first and second voltage levels.

5. The method of claim 2 wherein generating comprises:

generating a first differential signal corresponding to the first strobe signal by a first amplifier; and generating a second differential signal corresponding to the second strobe signal by a second amplifier.

6. The method of claim 5 wherein generating further comprises:

buffering the first differential signal to generate the first strobe signal; and buffering the second differential signal to generate the second strobe signal.

7. The method of claim 2 wherein the first and second selecting elements have approximately equal propagation delays.

8. The method of claim 2 wherein the first and second selecting elements are transistors having a gate-oxide thickness comparable with the second voltage level.

9. The method of claim 6 wherein the interface port is an Accelerated Graphics Port (AGP).

10. The method of claim 9 wherein the first and second modes are 4X and 2X transfer modes, respectively.

11. An apparatus comprising:

a selector to provide first and second selected signals from a plurality of signals, the plurality of signals being provided by a processor operating in first and second modes at first and second voltage levels, respectively, the second voltage level being higher than the first voltage level the selector operating at the second voltage level; and a signal generator coupled to the selector to generate first and second strobe signals from the first and second selected signals the first and second strobe signals being complementary to receive data on an interface port of the processor.

12. The apparatus of claim 11 wherein the selector comprises:
   a first selecting element to receive a common signal from the plurality of signals, the first selecting element providing the first selected signal; and
   a second selecting element to receive first and second mode signals from the plurality of signals, the second selecting element providing the second selected signal in response to a mode select signal.

13. The apparatus of claim 12 wherein the common signal and the second mode signals are complementary.

14. The apparatus of claim 13 wherein the first mode signal is a reference signal having a voltage level proportional to one of the first and second voltage levels.

15. The apparatus of claim 12 wherein the signal generator comprises:
   a first amplifier having first positive and negative inputs coupled to the selector to receive the first selected signal at the first positive input and the second selected signal at the first negative input, the first amplifier generating a first differential signal corresponding to the first strobe signal; and
   a second amplifier having second positive and negative inputs coupled to the selector to receive the first selected signal at the second negative input and the second selected signal at a second positive input, the second amplifier generating a second differential signal corresponding to the second strobe signal.

16. The apparatus of claim 15 wherein the signal generator further comprises:
   a first buffer coupled to the first amplifier to generate the first strobe signal from the first differential signal; and
   a second buffer coupled to the second amplifier to generate the second strobe signal from the second differential signal.

17. The apparatus of claim 12 wherein the first and second selecting elements have approximately equal propagation delays.

18. The apparatus of claim 12 wherein the first and second selecting elements are transistors having a gate-oxide thickness comparable with the second voltage level.

19. The apparatus of claim 16 wherein the interface port is an Accelerated Graphics Port (AGP).

20. The apparatus of claim 19 wherein the first and second modes are 4X and 2X transfer modes, respectively.

21. A system comprising:
   a processor;
   an interface port coupled to the processor to provide interface signals for transferring data; and
   an interface circuit coupled to the interface port comprising:
      a selector to provide first and second selected signals from a plurality of signals, the plurality of signals being provided by the processor operating in first and second modes at first and second voltage levels, respectively, the second voltage level being higher than the first voltage level the selector operating at the second voltage level, and
      a signal generator coupled to the selector to generate first and second strobe signals from the first and second selected signals the first and second strobe signals being complementary to receive the data on the interface port of the processor.

22. The system of claim 21 wherein the selector comprises:
   a first selecting element to receive a common signal from the plurality of signals, the first selecting element providing the first selected signal; and
   a second selecting element to receive first and second mode signals from the plurality of signals, the second selecting element providing the second selected signal in response to a mode select signal.

23. The system of claim 22 wherein the common signal and the second mode signals are complementary.

24. The system of claim 23 wherein the first mode signal is a reference signal having a voltage level proportional to one of the first and second voltage levels.

25. The system of claim 22 wherein the signal generator comprises:
   a first amplifier having first positive and negative inputs coupled to the selector to receive the first selected signal at the first positive input and the second selected signal at the first negative input, the first amplifier generating a first differential signal corresponding to the first strobe signal; and
   a second amplifier having second positive and negative inputs coupled to the selector to receive the first selected signal at the second negative input and the second selected signal at a second positive input, the second amplifier generating a second differential signal corresponding to the second strobe signal.

26. The system of claim 25 wherein the signal generator further comprises:
   a first buffer coupled to the first amplifier to generate the first strobe signal from the first differential signal; and
   a second buffer coupled to the second amplifier to generate the second strobe signal from the second differential signal.

27. The system of claim 22 wherein the first and second selecting elements have approximately equal propagation delays.

28. The system of claim 22 wherein the first and second selecting elements are transistors having a gate-oxide thickness comparable with the second voltage level.

29. The system of claim 26 wherein the interface port is an Accelerated Graphics Port (AGP).

30. The system of claim 29 wherein the first and second modes are 4X and 2X transfer modes, respectively.

* * * * *